Sept. 19, 1944.　　M. L. BENJAMIN ET AL　　2,358,299

PRECISION CHUCK

Filed Nov. 23, 1942

INVENTORS
MILTON L. BENJAMIN and
FRANKLYN E. WINNEN
BY
Oberlin, Limbach & Day.
ATTORNEYS Patented Sept. 19, 1944

2,358,299

UNITED STATES PATENT OFFICE 2,358,299

PRECISION CHUCK

Milton L. Benjamin, Cleveland, and Franklyn E. Winnen, Elyria, Ohio; said Winnen assignor to said Benjamin Application November 23, 1942, Serial No. 466,593

4 Claims. (Cl. 279—49)

The present invention relates to a chuck for gripping and holding a bar shaped tool, drill shank, stock bar, or the like, in precise and accurate alignment with the axis of the chuck. Our invention is particularly adapted to a collet chuck, such as that shown in Benjamin U. S. Patent No. 2,228,685, wherein a nose piece is mounted upon a long cylindrical bearing on the outer end of the chuck shank, and upon relative longitudinal movement of the nose piece with respect to the shank, the collapsible collet, through the action of cam seating surfaces, is adapted to be contracted and thus grip the tool or workpiece held in the chuck.

We have discovered, through the medium of our present invention, that it is possible to improve greatly upon the accuracy and precision of the gripping action of such a chuck. The tool gripping action of a collet chuck, of course, depends first of all upon the accuracy with which the individual interfitting and assembled parts are made; and secondly, upon the manner in which these parts move with respect to each other in order to produce the tool gripping pressure. Heretofore, such as exemplified in the aforesaid U. S. Patent No. 2,228,685, the pressure movement as well as the fastening action of the nose piece with respect to the chuck shank has been attained by the expedient of a screw thread connection. Thus, the movement of the nose piece with respect to the shank, in such a screw thread connection, would be dependent first of all upon the accuracy with which the screw threads were machined on to the parts, and secondly, upon the accuracy of the screw thread surfaces themselves.

Our invention eliminates any errors incident to the machining and forming of the screw threads which effect the relative movement of the nose piece to the shank of the chuck; and briefly stated, comprises the interposition of a spherical bearing surface between the nose piece and the screw thread connection, so that all the movement and pressure adduced by operation of the screw threads must pass through such spherical bearing surface which in turn insures accurate movement of the nose piece and uniform pressure exertion, both properly aligned with the longitudinal axis of the chuck.

It is a further object of our invention to provide such a spherical bearing surface which is generated by a radius whose center is located upon the axial center line of the chuck, so that all the pressure or movement force transmitted through such surface automatically seeks alignment with the chuck axis.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 1:
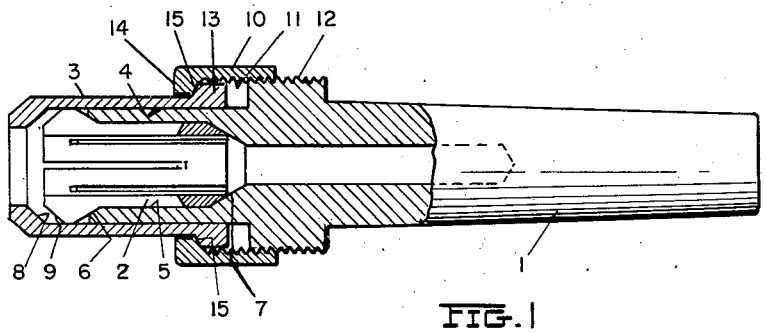
Fig. 1 is a longitudinal sectional view of a chuck having a construction embodying the principle of our invention.

Now referring more particularly to the drawing, there is shown in Fig. 1 thereof a chuck comprising a taper shank 1 adapted to be mounted in a drive shaft of a suitable power mechanism, with a slotted, expansible and contractible collet 2 for gripping the tool, drill shank or work bar (not shown); and a nose piece 3 mounted upon the outer, cylindrical bearing surface 4 of the shank 1. The shank 1 has an inner bore 5 for receiving the collet 2, and also the inclined, cam seating surfaces 6 and 7, engaging with complementary cam surfaces upon the collet 2 for producing the collapsing or gripping action of the latter.

The nose piece 3 also has an inclined surface 8 adapted to bear against the complementary cam seating surface 9 on the left-hand or outer end of the collet 2.

The clamping ring 10 has internal threads 11 which engage the external threads 12 on the chuck shank 1. The nose piece 3 has an outwardly projecting, annular flange 13 which is adapted to be engaged by the inwardly projecting, annular flange 14 on the clamping ring 10. The flanges 13 and 14 contact each other in the form of a spherical bearing surface as indicated at 15; the spherical bearing surface upon the flange 13 being convex, and that upon the flange 14 being concave.

Figure 2:
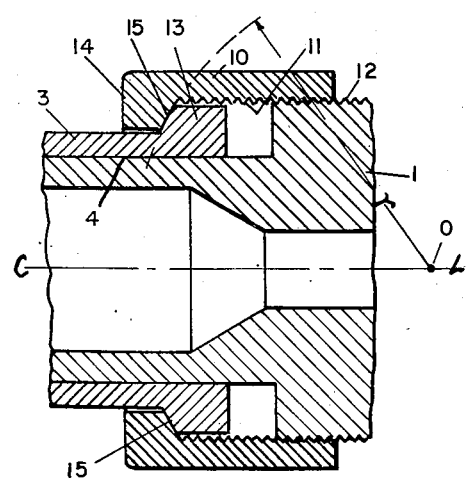
Fig. 2 is an enlarged, detailed view of a portion of Fig. 1 showing the spherical bearing surface connection between the nose piece and the shank of the chuck.

As best shown in Fig. 2, the spherical bearing surfaces 15 are disposed upon a sphere whose radius $r$ has its center at the point O upon the axial center line CL of the chuck shank 1. Thus, it will be seen, that as the screw threads 11 and 12 are tightened toward each other and pressure is exerted from the flange 14 to the flange 13 through the spherical bearing surfaces 15, that not only is there a complete surface-to-surface contact around the entire circumference of these parts, but that the resultant or resolved forces always tend to draw toward the point O whereby the nose piece, when moved to tightened position, (corresponding to tool gripping position of the chuck) is drawn toward the axis of the chuck and not to one side or the other of it. In other words, the movement of the nose piece 3 will thus be insured being in proper axial parallelism or alignment with the shank 1; and will not tend to be cocked or moved out of this alignment, which would otherwise be the case if any error in the construction of the screw threads 11 and 12 was directly transmitted to the nose piece.

Figure 3:
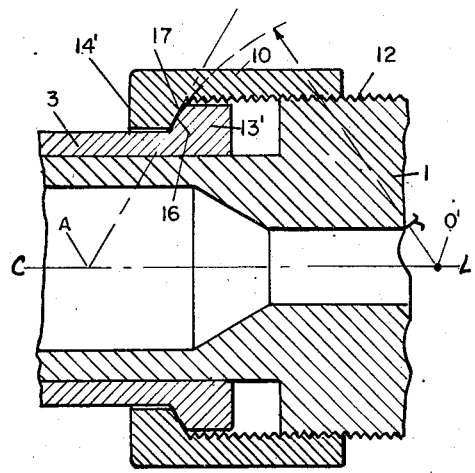
Fig. 3 is a view similar to Fig. 2 but showing a modified form of bearing surface.

In the modified form of construction shown in Fig. 3, the bearing surface takes the form of a spherical surface contacting a conical surface. Thus, the nose piece flange 13' has a convex spherical surface 16 whose radius of curvature is r having its center at O' on the axial center line of the shank 1; and the clamping ring flange 14' has a conical bearing surface 17 which in turn is a portion of a right cone whose apex A is also located upon the axial center line CL. In the construction of Fig. 3, the contact between the bearing surfaces 16 and 17 will be in the form of a circle or circumferential line, rather than that of a surface as in the case of Fig. 2; but the resultant transmission of motion and forces through this circular line of contact will still be in longitudinal alignment with that of the axis of the shank 1.

The chuck construction combining our above described invention renders the achievement of a remarkably high degree of precision and accuracy in the tool gripping action of the chuck, while eliminating the costly and time-consuming operations heretofore required for accurate manufacture of the assembled chuck parts. By reason of our invention, the same or a greater degree of accuracy in the tool gripping action may be achieved with a lesser degree of tolerance specifications for the screw threads 11 and 12 or for the long bearing 4, for example.

Other modes of applying the principle of the invention may be employed, change being made as regards the details described, provided the features stated in any of the following claims or the equivalent of such be employed.

We therefore particularly point and distinctly claim as our invention.

1. In a chuck, the combination of a shank, a collet centered within said shank, a nosepiece member longitudinally movable on said shank and engaging said collet, a ring member threadably engaging said shank, an outwardly projecting flange on said nosepiece member and an inwardly projecting flange on said ring member, said flanges overlapping each other in an axial direction, each of said flanges being radially spaced with respect to the member carrying the other flange, a spherical bearing surface on one of said flanges at the point of such overlapping, the other of said flanges having a surface contacting said spherical bearing surface, the center of said spherical bearing surface being located on the axial center line of said shank.

2. In a chuck, the combination of a shank, a collet centered within said shank, a nosepiece member longitudinally movable on said shank and engaging said collet, a ring member threadably engaging said shank, an outwardly projecting flange on said nosepiece member and an inwardly projecting flange on said ring member, said flanges overlapping each other in an axial direction, and being located adjacent the inner end of said nosepiece member, each of said flanges being radially spaced with respect to the member carrying the other flange, a spherical bearing surface on one of said flanges at the point of such overlapping, the other of said flanges having a surface contacting said spherical bearing surface, the center of said spherical bearing surface being located on the axial center line of said shank.

3. In a chuck, the combination of a shank, a collet centered within said shank, a nose piece member longitudinally movable on said shank and engaging said collet, a ring member threadably engaging said shank, an outwardly projecting flange on said nose piece member and an inwardly projecting flange on said ring member, said flanges overlapping each other in an axial direction, each of said flanges being radially spaced with respect to the member carrying the other flange, a convex spherical bearing surface on said nose piece flange, and a concave spherical bearing surface on said ring member flange, the centers of said spherical bearing surfaces located upon the axial center line of said shank.

4. In a chuck, the combination of a shank, an elongated cylindrical bearing surface on the outer end of said shank, a cylindrical nose piece slidably fitting on said bearing surface, a collet mounted within the end of said shank, cam seating surfaces between said collet and said shank and said nose piece, respectively, a clamping ring threadably engaging said shank and having an annular flange adapted to engage a similar flange on the inner end of said nose piece so as to draw said nose piece toward said shank to exert pressure on said collet through said cam seating surfaces, each of said flanges being radially spaced with respect to the member carrying the other flange, a convex spherical bearing surface on said nose piece flange, said spherical bearing surface having a radius of curvature whose center is located on the axial center line of said chuck, and a conical bearing surface on said clamping ring flange adapted to contact with said spherical bearing surface, such conical bearing surface being a portion of a right cone whose apex is also located on the axial center line of the shank.

MILTON L. BENJAMIN.
FRANKLYN E. WINNEN.